United States Patent
Burton

(10) Patent No.: US 9,881,643 B1
(45) Date of Patent: Jan. 30, 2018

(54) DATA STORAGE DEVICE GENERATING EXTENDED REDUNDANCY TO COMPENSATE FOR TRACK SQUEEZE

(71) Applicant: Western Digital Technologies, Inc., San Jose, CA (US)

(72) Inventor: Derrick E. Burton, Ladera Ranch, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/595,215

(22) Filed: May 15, 2017

(51) Int. Cl.
- G11B 20/18 (2006.01)
- G11B 27/36 (2006.01)
- G11B 5/09 (2006.01)
- G11B 20/12 (2006.01)

(52) U.S. Cl.
CPC ............. G11B 20/18 (2013.01); G11B 5/09 (2013.01); G11B 27/36 (2013.01); G11B 2020/1222 (2013.01)

(58) Field of Classification Search
CPC ... G11B 5/09; G11B 20/18; G11B 2020/1222; G11B 27/36
USPC ...... 360/31, 48, 53, 55, 69, 75, 77.01–77.08
See application file for complete search history.

(56) References Cited

U.S. PATENT DOCUMENTS

| | | | |
|---|---|---|---|
| 5,872,800 A * | 2/1999 | Glover | G11B 20/1833 360/53 |
| 6,747,827 B1 | 6/2004 | Bassett et al. | |
| 7,340,665 B2 * | 3/2008 | Tsang | H03M 13/2906 714/766 |
| 8,255,774 B2 | 8/2012 | Dixon | |
| 8,296,625 B2 | 10/2012 | Diggs et al. | |
| 8,539,313 B2 * | 9/2013 | D'Abreu | G06F 11/1048 714/760 |
| 8,856,618 B2 | 10/2014 | Akiyama et al. | |
| 8,885,276 B2 * | 11/2014 | Yang | H03M 13/1131 360/39 |
| 8,977,804 B1 | 3/2015 | Horn | |
| 9,229,813 B2 | 1/2016 | Chatradhi et al. | |
| 9,766,976 B2 * | 9/2017 | D'Abreu | G06F 11/1072 |
| 2013/0104001 A1 * | 4/2013 | Nakanishi | G06F 11/1048 714/758 |
| 2015/0128008 A1 | 5/2015 | Chatradhi et al. | |
| 2017/0147438 A1 | 5/2017 | Wu et al. | |
| 2017/0257121 A1 * | 9/2017 | Kwok | G06F 11/1076 |
| 2017/0262332 A1 * | 9/2017 | Barndt | G06F 11/1008 |
| 2017/0324430 A1 * | 11/2017 | Han | H03M 13/3746 |

* cited by examiner

Primary Examiner — Wayne Young
Assistant Examiner — James L Habermehl

(57) ABSTRACT

A data storage device is disclosed comprising a head actuated over a disk comprising a plurality of tracks. A first codeword is generated comprising first redundancy, and first position information of the head relative to a first track is saved while writing the first codeword to the first track. A second codeword is generated comprising second redundancy, and second position information of the head relative to a second track is saved while writing the second codeword to the second track. Extended redundancy is generated for the first codeword based on the first and second position information, and the first codeword is recovered from the first track based on the extended redundancy generated for the first codeword.

16 Claims, 6 Drawing Sheets

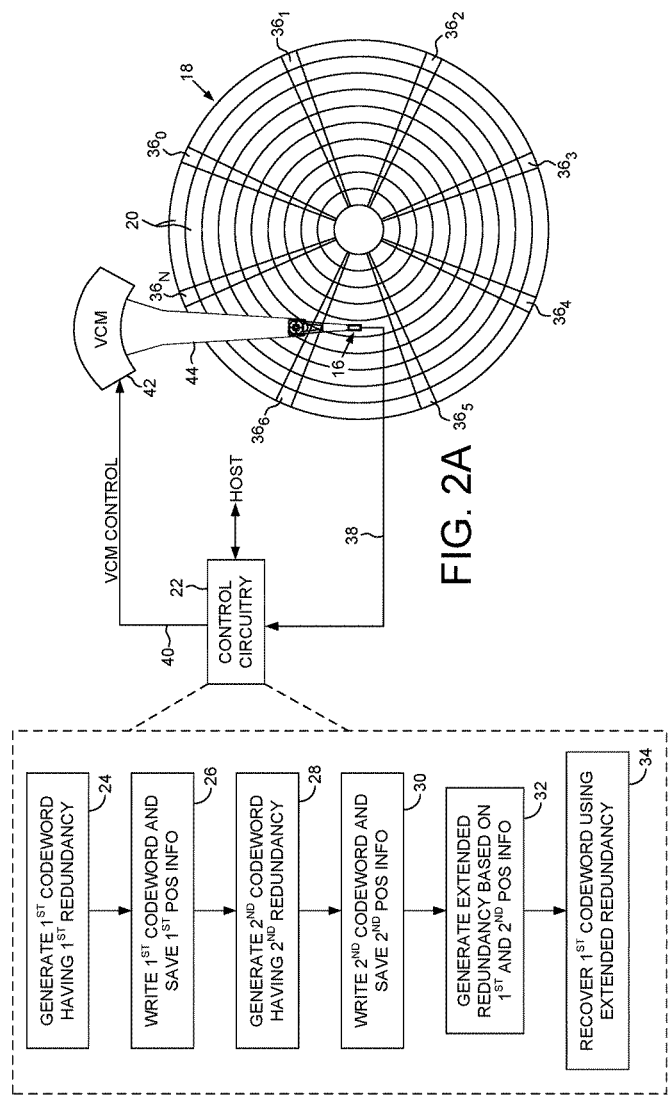

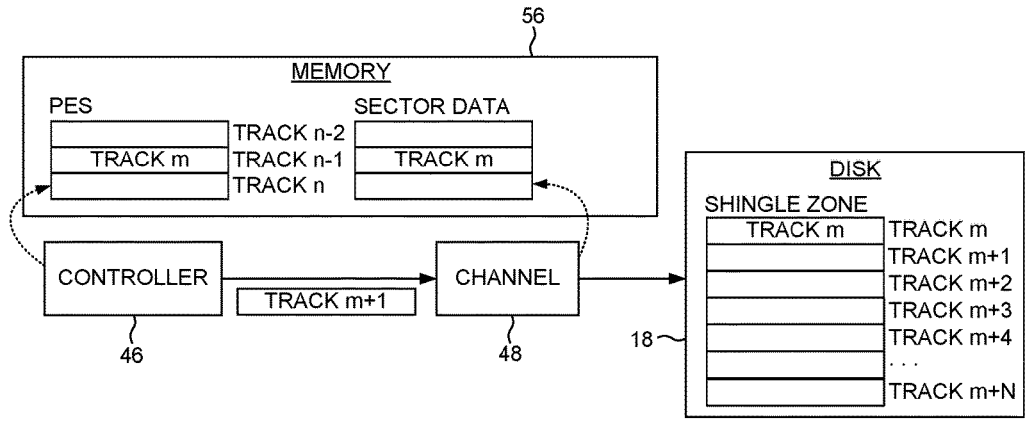
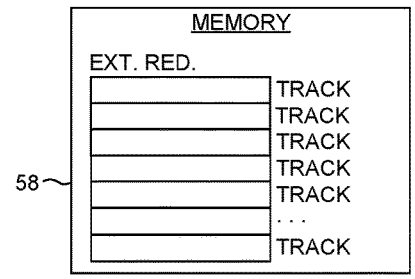
FIG. 3C
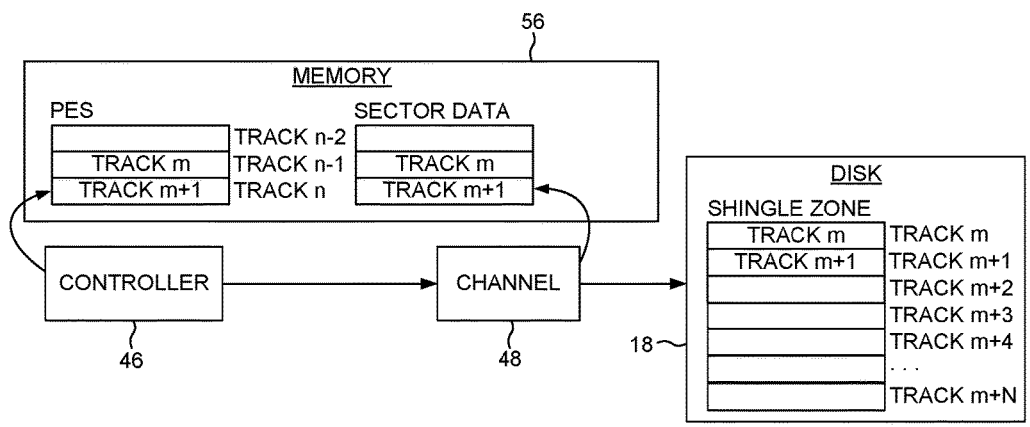
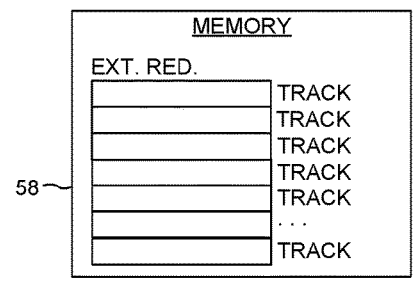
FIG. 3D

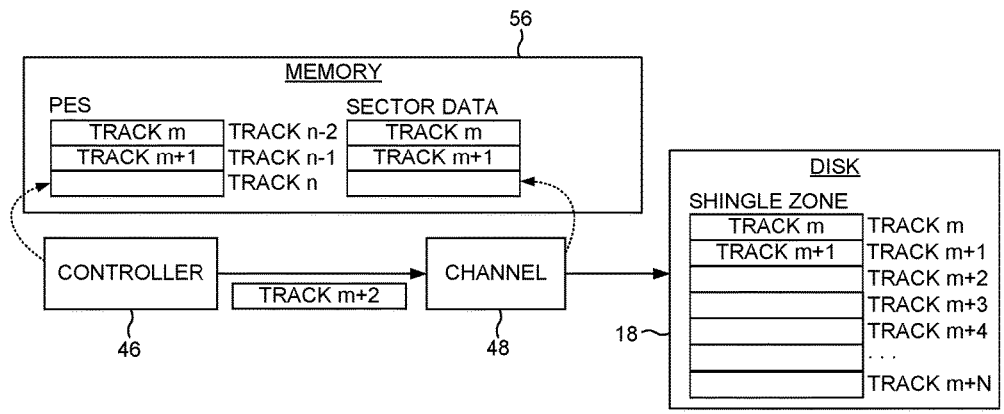
FIG. 3E
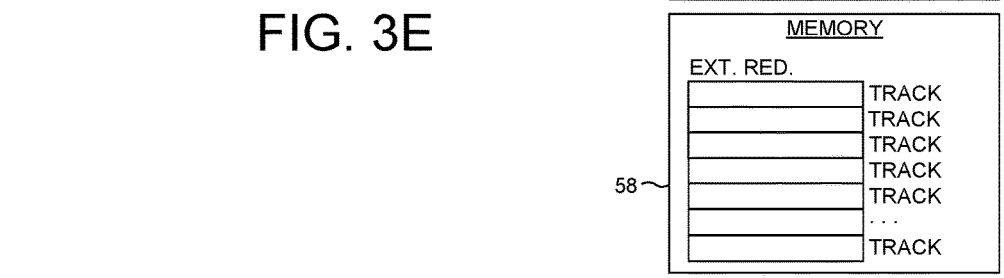
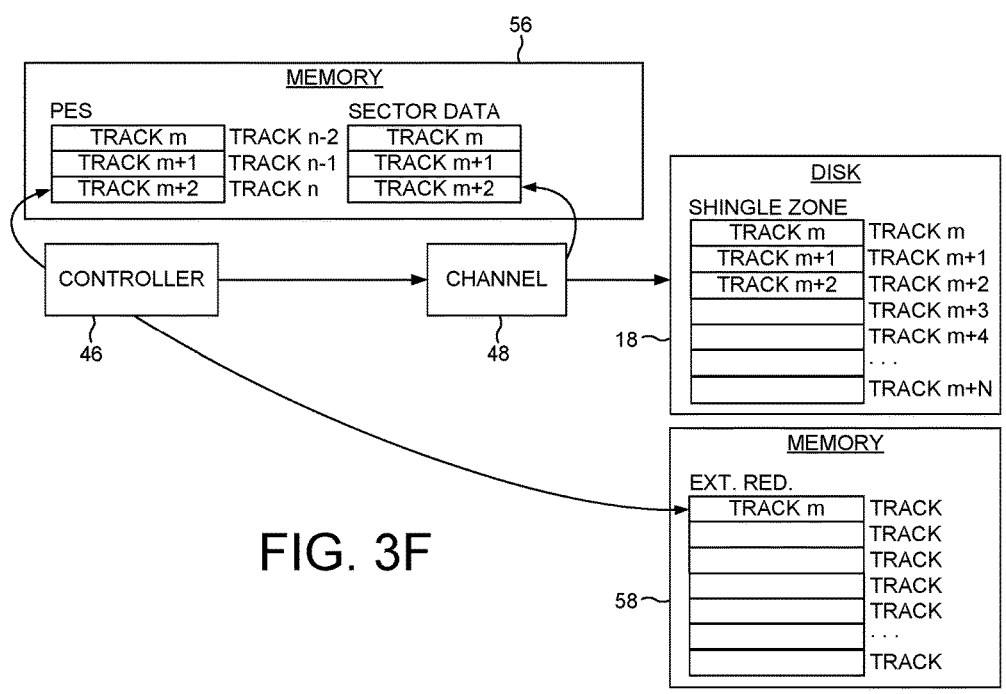
FIG. 3F

DATA STORAGE DEVICE GENERATING EXTENDED REDUNDANCY TO COMPENSATE FOR TRACK SQUEEZE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive comprising a head actuated over a disk comprising a plurality of tracks.

FIG. 2B is a flow diagram according to an embodiment wherein extended redundancy may be generated when a track squeeze condition is detected during a write operation.

FIGS. 3A-3F show an embodiment wherein position information and sector data are saved in memory and processed to generate extended redundancy when a track squeeze condition is detected.

DETAILED DESCRIPTION

Figure 1:
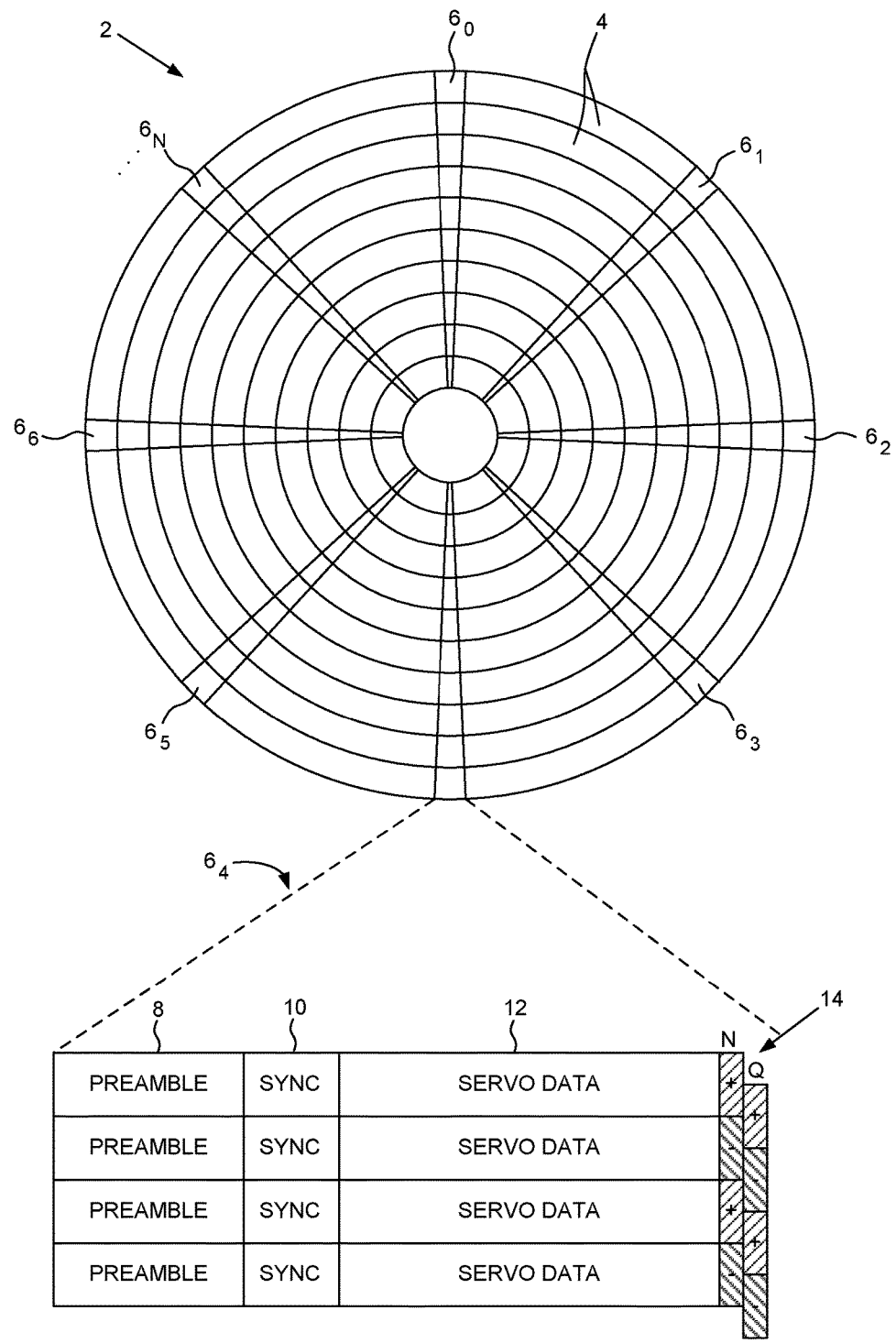
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising a plurality of tracks 20. The disk drive further comprises control circuitry 22 configured to execute the flow diagram of FIG. 2B, wherein a first codeword is generated comprising first redundancy (block 24), and first position information of the head relative to a first track is saved while writing the first codeword to the first track (block 26). A second codeword is generated comprising second redundancy (block 28), and second position information of the head relative to a second track is saved while writing the second codeword to the second track (block 30). Extended redundancy for the first codeword is generated based on the first and second position information (block 32), and during a read operation the first codeword may be recovered using the extended redundancy (block 34).

In the embodiment of FIG. 2A, the disk 18 comprises a plurality of servo sectors $36_0$-$36_N$ that define a plurality of servo tracks, wherein data tracks are defined relative to the servo tracks at the same or different radial density. The control circuitry 22 processes a read signal 38 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 40 applied to a voice coil motor (VCM) 42 which rotates an actuator arm 44 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the data tracks may be shingle written in order to increase the radial density of the data tracks, thereby increasing the capacity of the disk drive. With shingled writing, the data tracks are written in an overlapping manner such that a previously written track may be partially overwritten by a current written track. In one embodiment, the tracks may be grouped to form zones across the disk, wherein each zone may be shingle written from the beginning of the zone to the end of the zone. When the end of the zone is reached, the shingled writing may wrap to the beginning of the zone after performing a suitable garbage collection operation to relocate valid data sectors. In one embodiment when partially overwriting a previously written track, a disturbance to the servo control system when writing either or both the previous track or the current track may cause the previous track to be excessively overwritten resulting in a track squeeze condition that renders one or more data sectors in the previous track more difficult to recover. Accordingly in one embodiment when a track squeeze condition is detected while shingle writing the tracks, extended redundancy may be generated to help recover a data sector marginalized due to the track squeeze.

Figure 3A:
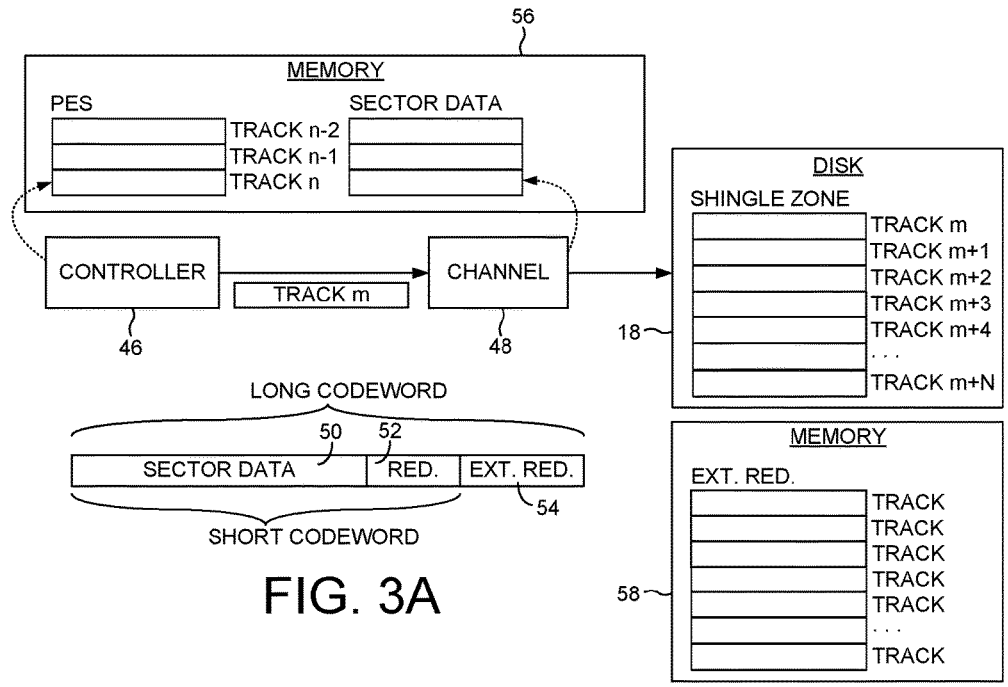
Figure 3B:
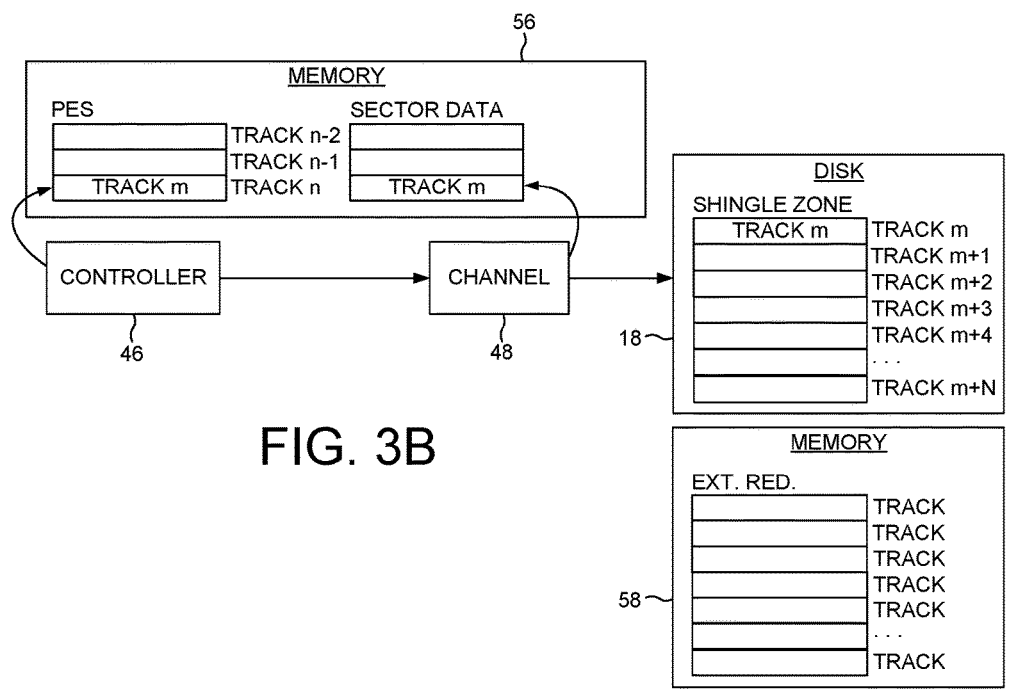

FIGS. 3A-3F illustrate an example of this embodiment wherein the control circuitry 22 of FIG. 2A comprises a controller 46 for implementing the servo control system including to generate the PES while writing to a current track, and a channel 48 for writing data to the tracks. The controller 46 encodes the data for the current track into a short codeword comprising sector data 50 and truncated redundancy 52, and a long codeword comprising extended redundancy 54. A volatile semiconductor memory 56 (e.g., a random access memory (RAM)) stores the PES generated at each servo sector of a track as well as the sector data written to each track. A non-volatile memory 58 (e.g., a Flash memory) stores the extended redundancy 54 corresponding to the short codewords written to the tracks on the disk with track squeeze. The example of FIG. 3A shows a write operation to track m of an empty shingle zone. The controller 46 encodes the sector data 50 for track m into short codewords comprising the truncated redundancy 52. The controller 46 may encode the sector data 50 into codewords using any suitable multi-rate error correction code, such as a multi-rate low density parity check (LDPC) code. While the channel 48 writes the short codewords to track m on the disk 18, the controller 46 stores the PES information generated at each servo sector for track m in memory 56, and the channel 48 stores the sector data 50 for track m in memory 56 as illustrated in FIG. 3B.

FIG. 3C shows a write operation to the next track (track m+1) of the shingle zone wherein the controller 46 encodes the sector data into short codewords and also conceptually shifts the PES and sector data stored in memory 56 so that track m is represented as position track n−1. While the channel 48 writes the short codewords to track m+1 on the disk 18, the controller 46 stores the PES information generated at each servo sector for track m+1 in memory 56, and the channel 48 stores the sector data for track m+1 in memory 56 as illustrated in FIG. 3D. FIG. 3E shows a write operation to the next track (track m+2) of the shingle zone wherein the controller 46 encodes the sector data into short codewords and also conceptually shifts the PES and sector data stored in memory 56 so that track m is represented as position track n−2 and track m+1 is represented as position track n−1. While the channel 48 writes the short codewords to track m+2 on the disk 18, the controller 46 stores the PES information generated at each servo sector for track m+2 in memory 56, and the channel 48 stores the sector data for track m+2 in memory 56 as illustrated in FIG. 3F. Additionally in FIG. 3F the controller 46 evaluates the PES stored in the memory 56 generated for one or both tracks m and m+1 in order to detect track squeeze conditions for track m. If a track squeeze condition is detected for a data sector in track m, the controller 46 reprocesses the sector data stored in the memory 56 in order to generate a long codeword comprising the extended redundancy 54 (FIG. 3A). The extended redundancy for the long codeword is stored in the memory 58, and when the short codeword representing the data sector is read from the disk during a read operation, the controller 46 reads the extended redundancy 54 from the memory 58 in order to generate the long codeword. The controller 46 then decodes the long codeword, wherein the extended redundancy 54 increases the likelihood of a successful decode, thereby compensating for the additional signal noise caused by the track squeeze condition.

The extended redundancy 54 of a long codeword shown in FIG. 3A may be generated at any suitable time. In one embodiment, the controller 46 may generate the extended redundancy 54 for a data sector during an idle mode when not executing other operations (e.g., not executing write or read operations). In one embodiment, when a track squeeze condition is detected, the corresponding sector data may be transferred from volatile memory 56 to non-volatile memory 58 so that generating the extended redundancy 54 may be deferred until the idle mode. In this embodiment, the sector data may be retained in the event of a power failure so that the extended redundancy 54 may be generated at any time. In yet another embodiment, memory 56 may be implemented as a non-volatile memory (e.g., part of memory 58) so that the PES and sector data are retained in the event of a power failure.

In one embodiment, if a read command is received to read a data sector having sector data stored either in memory 56 or memory 58, the sector data may be read from either memory rather than from the disk. That is, memory 56 and/or memory 58 may in one embodiment operate as a read cache in order to expedite a read operation as well as ensure the integrity of the data. Once the extended redundancy 54 has been generated and saved in memory 58 for all the data sectors of a track subject to track squeeze, the PES and sector data may be flushed from memory 56 (and/or memory 58) to allocate space for subsequently written tracks.

In one embodiment, the controller 46 may encode the long codeword including the extended redundancy 54 for every data sector as each track is written. In this embodiment, the controller 46 may store the extended redundancy 54 in the memory 56 instead of the sector data 50. When a track squeeze condition is detected, the controller 46 may transfer the extended redundancy 54 for the data sector from memory 56 to memory 58. In this embodiment, the controller 46 need not reprocess the sector data 50 in order to generate the extended redundancy 54 when a track squeeze condition is detected. This embodiment may also help ensure the extended redundancy 54 can be transferred to the non-volatile memory 58 before or during a power failure.

In yet another embodiment, the controller 46 may operate in either mode described above depending on whether track squeeze conditions are likely. For example, the controller 46 may operate in a normal mode wherein the sector data is stored in memory 56 and the extended redundancy 54 generated after a track squeeze condition is detected. The controller 46 may then enter a track squeeze mode, such as when an external vibration affecting the disk drive is detected, or when a predetermined number of track squeeze conditions are detected while writing the tracks of a shingle zone. For example, if a track squeeze condition is detected while writing a predetermined number of consecutive tracks, the controller 46 may enter the track squeeze mode in order to generate the long codewords including the extended redundancy 54 for every data sector. When the disturbance causing the track squeeze condition subsides, the controller 46 may revert back to the normal mode in order to conserve processing cycles and power.

The controller 46 may generate the extended redundancy for one or more data sectors of a track in any suitable manner. In the embodiment shown in FIG. 3A, the controller 46 may generate the extended redundancy 54 by encoding the sector data of each affected data sector into a long codeword using a multi-rate error correction code. In another embodiment, the extended redundancy may be generated over multiple data sectors of a track. For example, in one embodiment when a track squeeze condition is detected for any part of a track, the controller 46 may generate a parity sector over two or more data sectors of a track (e.g., all of the data sectors of a track). If during a read operation a codeword representing a data sector of a track cannot be decoded (e.g., due to a track squeeze), the parity sector stored in memory 58 may be processed to recover the unrecoverable codeword.

In one embodiment, when the control circuitry 46 begins writing to a different shingle zone, the PES and sector data stored in memory 56 for the previous shingle zone may be saved in a non-volatile memory, such as on the disk 18 or in memory 58. When the control circuitry 46 transitions back to writing to the previous shingle zone, the PES and sector data may be read from the non-volatile memory in order to initialize the memory 56 to the previous state for the previous shingle zone. That is, in one embodiment the state of the PES and sector data may be saved in non-volatile memory for each shingle zone, and the memory 56 initialized appropriately as the control circuitry 46 transitions between shingle zones. In an alternative embodiment, the PES may be saved in non-volatile memory for each zone whereas the sector data may be read from the last written track of a newly selected shingle zone in order to initialize the memory 56.

Figure 4:
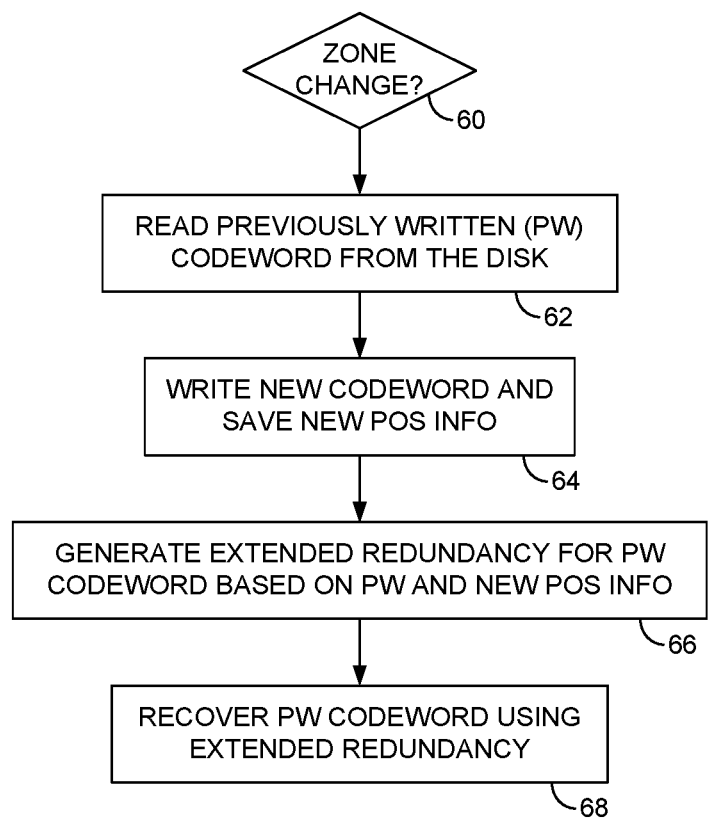
FIG. 4 is a flow diagram according to an embodiment wherein when there is a shingle zone change, at least one codeword is read from the last written track of the newly selected zone before writing to a current track.

This embodiment is understood with reference to the flow diagram of FIG. 4, wherein when there is shingle zone change (block 60), at least one previously written codeword is read from the last written track of the newly selected shingle zone (block 62). A new codeword is then written to the current track and the new PES saved in memory 56. When a track squeeze condition is detected based on the position information generated for the previously written codeword and the position information generated for the newly written codeword, extended redundancy is generated for the previously written codeword (block 66). When reading the previously written codeword from the shingle zone, the codeword may be recovered using the extended redundancy to compensate for the track squeeze condition.

In the embodiments described above, extended redundancy may be generated when a track squeeze condition is detected for a track adjacent a current written track. In another embodiment, a track squeeze condition may be detected for a track that is proximate a current written track, such as a previously written track that is at least one track away from the current written track. For example, a vibration disturbance may cause the head to deviate off-track enough to corrupt data not just in the previously written adjacent track, but also data in tracks that are one or more tracks away from the current track. Accordingly in this embodiment, extended redundancy may be generated and stored for codewords that are corrupted in any suitable number of proximate tracks that may be adversely affected when writing to a current track as detected by evaluating the position information of the previously written codewords and the position information generated while writing to the current track.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
 a disk comprising a plurality of tracks, wherein each track comprises a plurality of data sectors;
 a head actuated over the disk; and
 control circuitry configured to:
  generate a first codeword comprising first redundancy;
  save first position information of the head relative to a first track while writing the first codeword to a first data sector of the first track;
  generate a second codeword comprising second redundancy;
  save second position information of the head relative to a second track while writing the second codeword to a second data sector of the second track;
  generate extended redundancy over only the first codeword based on the first and second position information; and
  recover the first codeword from the first track based on the extended redundancy generated for the first codeword.

2. The data storage device as recited in claim 1, wherein the second track is adjacent the first track.

3. The data storage device as recited in claim 1, wherein the second track is proximate the first track.

4. The data storage device as recited in claim 1, wherein the control circuitry is further configured to generate the extended redundancy for the first codeword when the first and second position information indicate the writing of the second codeword adversely affected the first codeword.

5. The data storage device as recited in claim 1, further comprising a non-volatile semiconductor memory (NVSM), wherein the control circuitry is further configured to store the extended redundancy in the NVSM.

6. The data storage device as recited in claim 1, wherein the control circuitry is further configured to:
define a plurality of zones on the disk, where each zone comprises a plurality of the tracks; and
save previous position information of the last written track in each zone.

7. The data storage device as recited in claim 6, wherein the control circuitry is further configured to:
generate a third codeword comprising third redundancy
save third position information of the head relative to a third track while writing the third codeword to the third track;
generate extended redundancy for the second codeword based on the previous and third position information; and
recover the second codeword from the second track based on the extended redundancy generated for the second codeword.

8. The data storage device as recited in claim 7, wherein the control circuitry is further configured to:
prior to writing the third codeword to the third track, read at least one previously written codeword from the second track; and
generate the extended redundancy for the second codeword by processing the previously written codeword read from the second track.

9. A method of operating a data storage device, the method comprising:
generating a first codeword comprising first redundancy;
saving first position information of a head relative to a first track on a disk while writing the first codeword to a first data sector of the first track;
generating a second codeword comprising second redundancy;
saving second position information of the head relative to a second track on the disk while writing the second codeword to a second data sector of the second track;
generating extended redundancy over only the first codeword based on the first and second position information; and
recovering the first codeword from the first track based on the extended redundancy generated for the first codeword.

10. The method as recited in claim 9, wherein the second track is adjacent the first track.

11. The method as recited in claim 9, wherein the second track is proximate the first track.

12. The method as recited in claim 9, further comprising generating the extended redundancy for the first codeword when the first and second position information indicate the writing of the second codeword adversely affected the first codeword.

13. The method as recited in claim 9, further comprising storing the extended redundancy in a non-volatile semiconductor memory (NVSM).

14. The method as recited in claim 9, further comprising:
defining a plurality of zones on the disk, where each zone comprises a plurality of the tracks; and
saving previous position information of the last written track in each zone.

15. The method as recited in claim 14, further comprising:
generating a third codeword comprising third redundancy
saving third position information of the head relative to a third track while writing the third codeword to the third track;
generating extended redundancy for the second codeword based on the previous and third position information; and
recovering the second codeword from the second track based on the extended redundancy generated for the second codeword.

16. The method as recited in claim 15, further comprising:
prior to writing the third codeword to the third track, reading at least one previously written codeword from the second track; and
generating the extended redundancy for the second codeword by processing the previously written codeword read from the second track.

* * * * *